United States Patent
Gstrein et al.

(10) Patent No.: US 11,976,792 B2
(45) Date of Patent: May 7, 2024

(54) ASYMMETRICAL LINEAR LENS AND ASSOCIATED LINEAR LUMINAIRE

(71) Applicant: Nimbus Group GmbH, Stuttgart (DE)

(72) Inventors: Manfred Gstrein, Absam (AT); Florian Frischmann, Imst (AT)

(73) Assignee: Nimbus Group GmbH, Stuttgart (DE)

( * ) Notice: Subject to any disclaimer, the term of this patent is extended or adjusted under 35 U.S.C. 154(b) by 0 days.

(21) Appl. No.: 18/053,520

(22) Filed: Nov. 8, 2022

(65) Prior Publication Data
US 2023/0096907 A1 Mar. 30, 2023

Related U.S. Application Data

(63) Continuation of application No. PCT/EP2021/061020, filed on Apr. 27, 2021.

(30) Foreign Application Priority Data

May 18, 2020 (DE) ...................... 20 2020 102 825.1

(51) Int. Cl.
| | |
|---|---|
| *F21K 9/69* | (2016.01) |
| *F21V 5/08* | (2006.01) |
| *F21Y 115/10* | (2016.01) |
| *G02B 3/00* | (2006.01) |
| *G02B 3/02* | (2006.01) |

(52) U.S. Cl.
CPC .................. *F21K 9/69* (2016.08); *F21V 5/08* (2013.01); *G02B 3/02* (2013.01); *F21Y 2115/10* (2016.08); *G02B 2003/0093* (2013.01)

(58) Field of Classification Search
CPC .... F21K 9/69; F21V 5/08; G02B 3/02; G02B 2003/0093
See application file for complete search history.

(56) References Cited

U.S. PATENT DOCUMENTS

| | | | | |
|---|---|---|---|---|
| 7,195,383 | B2 * | 3/2007 | Gebauer | ................. F21V 14/00 362/521 |
| 8,801,242 | B2 * | 8/2014 | Hamm | ................. F21S 41/151 362/487 |
| 9,611,997 | B2 * | 4/2017 | Bauer | ..................... F21S 41/43 |
| 9,664,847 | B2 * | 5/2017 | Krenn | ..................... F21S 41/29 |

(Continued)

FOREIGN PATENT DOCUMENTS

| | | |
|---|---|---|
| DE | 10 2011 077 636 A1 | 11/2011 |
| DE | 10 2016 225 199 A1 | 6/2018 |

(Continued)

*Primary Examiner* — Arman B Fallahkhair
(74) *Attorney, Agent, or Firm* — Orbit IP

(57) ABSTRACT

An asymmetrical linear lens directing light at a limited solid angle includes a first solid profile section being a right trapezoid having a short and longer base side and two side legs. A second solid profile section is a non-right trapezoid having a short and longer base side and two side legs. The longer base side of the first solid profile section and the shorter base side of the second solid profile section coincide. One of the two side legs of the first solid profile section and one of the two side legs of the second solid profile section lie on a straight line enclosing a first angle with the longer base side of the second solid profile section. The other side leg of the second solid profile section is angled outward in relation to the other side leg of the first solid profile section by a second angle.

20 Claims, 2 Drawing Sheets

(56) References Cited

U.S. PATENT DOCUMENTS

| | | | |
|---|---|---|---|
| 9,851,065 B2 | 12/2017 | Taudt et al. | |
| 9,982,862 B2 * | 5/2018 | Stefanov | F21S 41/285 |
| 10,323,837 B2 * | 6/2019 | Hierzer | F21V 21/35 |
| 10,352,523 B2 * | 7/2019 | Nishimura | F21S 41/40 |
| 10,473,286 B2 * | 11/2019 | Nishimura | F21S 41/143 |
| 10,627,065 B2 * | 4/2020 | Godderidge | F21S 41/26 |
| 11,193,641 B2 * | 12/2021 | Taudt | F21S 41/322 |
| 2020/0056758 A1 | 2/2020 | Yang | |

FOREIGN PATENT DOCUMENTS

| | | |
|---|---|---|
| DE | 10 2017 125 212 A1 | 5/2019 |
| EP | 3 260 768 A1 | 12/2017 |
| EP | 2 421 414 B1 | 10/2018 |
| EP | 3 336 420 B1 | 2/2020 |
| WO | 2010/122154 A1 | 10/2010 |

\* cited by examiner

ASYMMETRICAL LINEAR LENS AND ASSOCIATED LINEAR LUMINAIRE

CROSS-REFERENCE TO RELATED APPLICATIONS

This continuation application claims priority to PCT/EP2021/061020 filed on Apr. 27, 2021 which has published as WO 2021/233650 A1 and also the German application number 20 2020 102 825.1 filed on May 18, 2020, the entire contents of which are fully incorporated herein with these references.

DESCRIPTION

Field of the Invention

The invention relates to an asymmetrical linear lens for directing light at a limited solid angle and a linear luminaire having such a linear lens.

Background of the Invention

An asymmetrical lens in the form of an integral transparent plastic solid profile for directing light at a limited solid angle is known from EP 2 421 414 B1. The outside of the solid profile has two profile contours each rising from the profile edge toward the profile center, wherein one profile contour is set back in relation to the other profile contour in the profile center.

In contrast, it is the object of the present invention to specify an alternative asymmetrical linear lens. In particular, the linear lens is to decouple coupled-in light on one profile side at a lateral exit angle of up to approximately 35° and on the other profile side at a lateral exit angle of up to approximately 80° to 85°.

SUMMARY OF THE INVENTION

This object is achieved according to the invention by an asymmetrical linear lens in the form of an integral, transparent plastic solid profile for directing light at a limited solid angle, comprising a first solid profile section in the form of a right trapezoid having a short and a longer base side and having two side legs, and comprising a second solid profile section in the form of a non-right trapezoid having a short and a longer base side and having two side legs, wherein the longer base side of the first solid profile section and the shorter base side of the second solid profile section coincide with one another, wherein one of the two side legs of the first solid profile section and one of the two side legs of the second solid profile section lie on a straight line, which encloses a first angle in the range between 40° and 50° with the longer base side of the second solid profile section, and wherein the other side leg of the second solid profile section is angled outward in relation to the other side leg of the first solid profile section by a second angle in the range between 25° and 35°.

The first angle is preferably in the range between 43° and 47° and is in particular 45°. The second angle is preferably in the range between 28° and 32° and is in particular 30°.

A profile detent web can protrude from each of the two side legs of the second solid profile section in the direction perpendicular from the longer base side of the second solid profile section away from this base side.

The invention also relates to a linear luminaire comprising a U-shaped profile having a luminous band arranged off-center on the inside on the profile bottom of the U-shaped profile, in particular an LED band, and comprising an asymmetrical linear lens as designed above arranged in front of the luminous band, which has a coupling surface for coupling in the light emitted by the luminous band and a decoupling surface for decoupling the coupled-in light, wherein the coupling and decoupling surfaces extend in parallel to one another and the profile width of the linear lens is greater at the decoupling surface than at the coupling surface.

In comparison to an LED band without linear lens arranged in front of it, in the linear luminaire according to the invention, the illuminance (in lx) can be increased significantly (by up to 100%) in the desired functional range and the dazzling can be reduced significantly (by up to 85%) in the undesired range. The linear luminaire according to the invention is suitable for attachment underneath or for surface-flush installation and can be used, for example, as work surface lighting in kitchens and laboratories or as cabinet interior light.

The linear lens preferably closes the open side of the U-shaped profile and is inserted therein and locked.

In one preferred embodiment of the invention, the profile bottom has a bottom groove on the inside, in which the luminous band is inserted and fastened thereon. For the case in which the bottom groove is wider than the luminous band used, the groove flanks of the bottom groove can be used either as a left or right stop for the inserted luminous band.

Further advantages of the invention result from the description, the claims, and the drawings. The features mentioned above and the features listed hereinafter can each be used as such or in groups in arbitrary combinations. The embodiments shown and described are not to be understood as an exhaustive list but rather have exemplary character for the description of the invention.

DETAILED DESCRIPTION OF THE PREFERRED EMBODIMENTS

Figure 1:
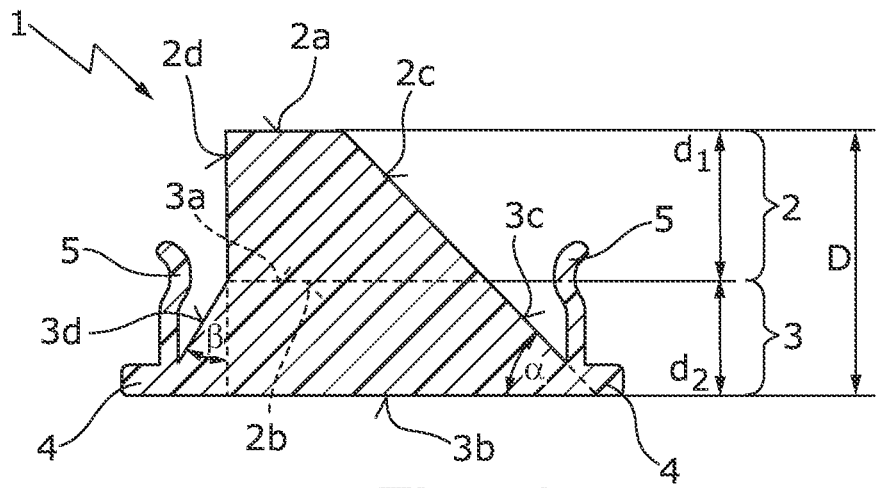
FIG. 1 shows the profile cross section of a linear lens according to the invention.

The asymmetrical linear lens 1 shown in FIG. 1 is used to direct light at a limited solid angle and is formed as an integral plastic solid profile transparent to visible light.

The linear lens 1 comprises a first solid profile section 2 in the form of a right trapezoid having a short and a (virtual) longer base side 2a, 2b and having two side legs 2c, 2d and comprising a second solid profile section 3 in the form of a non-right trapezoid having a (virtual) short and a longer base side 3a, 3b and having two side legs 3c, 3d. The longer base side 2b of the first solid profile section 2 and the shorter base side 3a of the second solid profile section 3 coincide, i.e., the longer base side 2b of the first solid profile section 2 and the shorter base side 3a of the second solid profile section 3 are formed by the same virtual line. The shorter base side 2a of the first solid profile section 2 and the longer base side 3b of the second solid profile section 3 extend in parallel to one another. The thickness d1 of the first solid profile section 2 is preferably approximately 1.25 times greater than the thickness d2 of the second solid profile section 3. In one preferred exemplary embodiment, d1 is 4.4 mm and d2 is 5.6 mm, thus the total thickness D is 10 mm, and the width of the shorter base side 2a is 19 mm.

The side leg 2c of the first solid profile section 2 and the side leg 3c of the second solid profile section 3 lie on a straight line, which encloses a first angle α of preferably approximately 45° with the longer base side 3b of the second solid profile section 2. The other side leg 3d of the second solid profile section 3 is angled outward by a second angle β of approximately 30° in relation to the other side leg 2d of the first solid profile section 2. The second solid profile section 3 is provided in the two corner regions, which are formed by the longer base side 3b and the respective side legs 3c, 3d, with lateral, plate-shaped attachments 4, from each of which a profile detent web 5 protrudes at an angle perpendicular to the longer base side 3b of the second solid profile section 3 in the direction away from this longer base side 3b.

Figure 2:
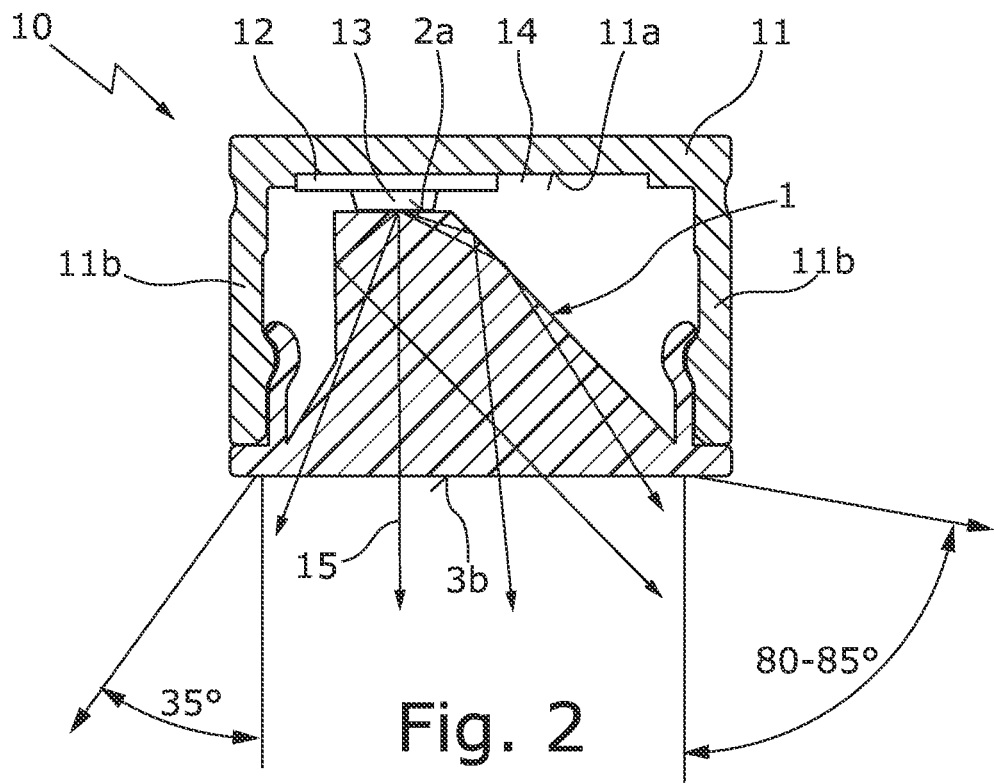
FIG. 2 shows a linear luminaire having the linear lens according to the invention and schematically shows the associated beam path through the linear lens.

The linear luminaire 10 shown in FIG. 2 comprises a U-shaped profile 11 made of, for example, metal (preferably aluminum), a luminous band arranged off-center on the inside on the profile bottom 11a of the U-shaped profile 11 in the form of an LED band 12 (for example, 5 mm or 8 mm wide) having multiple LEDs 13 spaced apart in the band longitudinal direction, and a linear lens 1 arranged in front of the LED band 12. The profile bottom 11 has a bottom groove 14 on the inside, in which the LED band 12 is inserted and adhesively bonded. If, as shown, the bottom groove 14 is wider than the LED band 12, the two groove flanks of the bottom groove 14 are used as the left or right stop for the inserted LED band 12.

The linear lens 1 is inserted with its two-sided profile detent webs 5 in the open side of the U-shaped profile 11 and locked with the two profile legs 11b of the U-shaped profile 11, by which the open side of the U-shaped profile 11 is closed.

The shorter base side 2a of the first solid profile section 2 forms a coupling surface for coupling in the light 15 emitted by the LED band 12, and the longer base side 3b of the second solid profile section 3 forms a decoupling surface for decoupling the coupled-in light 15, wherein the coupling and decoupling surfaces 2a, 3b extend in parallel to one another. The coupled-in light 15 either exits from the decoupling surface 3b, without having been reflected on the side legs 2c, 2d, 3c, 3d of the two solid profile sections 2, 3, or after total reflection on the side legs 2c, 2d, 3c, 3d. On the left profile side in FIG. 2, the light 15 exits at a lateral exit angle of up to approximately 35° and on the right profile side in FIG. 2, it exits at a lateral exit angle of up to approximately 80° to 85°, so that in total emission takes place in an overall emission angle of 115° to 120°. The transmittance of the linear lens 1 for the emitted visible light is ideally at least approximately 90%.

Figure 3:
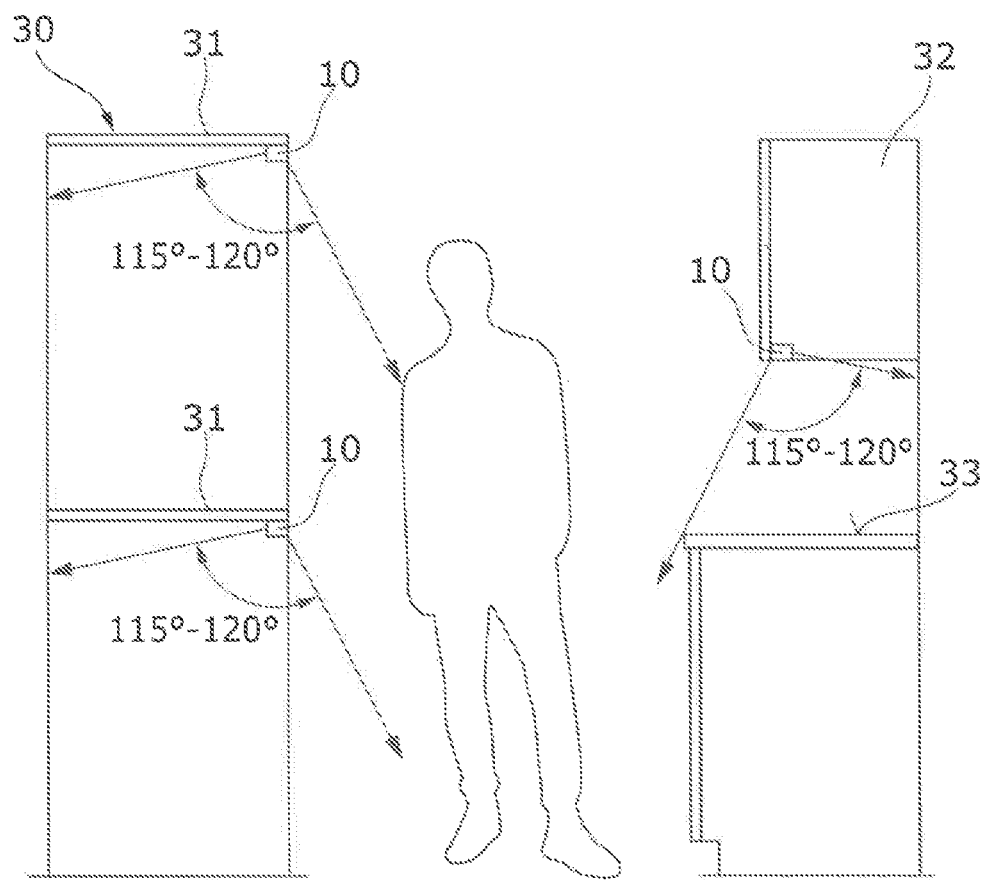
FIG. 3 shows a cabinet having two linear luminaires for interior lighting and a kitchen wall unit having a linear luminaire for work surface lighting.

FIG. 3 shows a cabinet 30 comprising two linear luminaires 10 each fastened on the underside on an upper panel or intermediate panel 31 for cabinet interior lighting and a wall unit 32 having a linear luminaire 10 fastened on the underside for lighting a work surface 33 arranged under the wall unit 32. The linear luminaires 10 are each arranged on the front side on the upper panel or intermediate panel 31 or on the wall unit 32, preferably attached on the underside thereon or installed surface-flush therein, and radiate at an exit angle of up to approximately 35° to the front and at an exit angle of up to approximately 80° to 85° to the rear. In comparison to an LED band 12 without linear lens arranged in front of it, the illuminance (in lx) is increased by 100% in the desired functional range and the dazzling is reduced by 85% in the undesired range.

What is claimed is:

1. An asymmetrical linear lens in the form of an integral transparent plastic solid profile for directing light at a limited solid angle, the asymmetrical linear lens comprising:
    a first solid profile section in the form of a right trapezoid having a short and a longer base side and having two side legs, wherein the right trapezoid is defined as a quadrilateral with two right angles and two non-right angles; and
    a second solid profile section in the form of a non-right trapezoid having a short and a longer base side and having two side legs, wherein the non-right trapezoid is defined as a quadrilateral with four non-right angles;
    wherein the longer base side of the first solid profile section and the shorter base side of the second solid profile section coincide with one another;
    wherein one of the two side legs of the first solid profile section and one of the two side legs of the second solid profile section lie on a straight line which encloses a first angle (α) in the range between 40° and 50° with the longer base side of the second solid profile section;
    wherein the other side leg of the second solid profile section is angled outward in relation to the other side leg of the first solid profile section by a second angle (ß) in the range between 25° and 35°; and
    wherein a thickness of the first solid profile section is approximately 1.25 times greater than a thickness of the second solid profile section.

2. A linear luminaire, comprising:
    a U-shaped profile;
    a luminous band arranged off-center on an inside on a profile bottom of the U-shaped profile; and
    the asymmetrical linear lens arranged in front of the luminous band as claimed in claim 1, which has a coupling surface for coupling in the light emitted by the luminous band and a decoupling surface for decoupling the coupled-in light;
    wherein the coupling and decoupling surfaces extend in parallel to one another and the profile width of the asymmetrical linear lens is greater at the decoupling surface than at the coupling surface.

3. The linear luminaire as claimed in claim 2, wherein the profile bottom has a bottom groove on the inside, wherein the luminous band is inserted and fastened thereon.

4. The linear luminaire as claimed in claim 3, wherein the bottom groove is wider than the luminous band and the groove flanks of the bottom groove form either a left or right stop for the inserted luminous band.

5. The linear luminaire as claimed in claim 2, wherein the linear lens closes the open side of the U-shaped profile.

6. The linear luminaire as claimed in claim 2, wherein the linear lens is inserted into the open side of the U-shaped profile and locked with the U-shaped profile.

7. The linear luminaire as claimed in claim 2, wherein the light is configured to exit the decoupling surface on one profile side of the decoupling surface at a lateral exit angle of up to approximately 35° from perpendicular to the decoupling surface and on the other profile side of the decoupling surface at a lateral exit angle of up to approximately 80° to 85° from perpendicular to the decoupling surface.

8. The linear luminaire as claimed in claim 2, wherein the luminous band is an LED band.

9. The asymmetrical linear lens as claimed in claim 1, wherein the first angle (α) is in the range between 43° and 47°.

10. The asymmetrical linear lens as claimed in claim 1, wherein the second angle (ß) is in the range between 28° and 32°.

11. The asymmetrical linear lens as claimed in claim 1, wherein a profile detent web protrudes from each of the two side legs of the second solid profile section in the direction perpendicular to the longer base side of the second solid profile section away from this base side.

12. The asymmetrical linear lens as claimed in claim 1, wherein the second solid profile section has lateral attachments in the two corner regions of the longer base side and the two side legs.

13. The asymmetrical linear lens as claimed in claim 1, wherein the first angle (α) is 45°.

14. The asymmetrical linear lens as claimed in claim 1, wherein the second angle (ß) is 30°.

15. The asymmetrical linear lens as claimed in claim 1, wherein a thickness of the first solid profile section is 4.4 mm and a thickness of the second solid profile section is 5.6 mm, the total thickness being 10 mm.

16. The asymmetrical linear lens as claimed in claim 1, wherein a width of the shorter base side is 19 mm.

17. A linear luminaire, comprising:
a U-shaped profile;
a luminous band arranged off-center on the inside on a profile bottom of the U-shaped profile; and
an asymmetrical linear lens arranged in front of the luminous band;
wherein the asymmetrical linear lens is in the form of an integral transparent plastic solid profile configured for directing light at a limited solid angle, the asymmetrical linear lens comprising:
  a first solid profile section in the form of a right trapezoid having a short and a longer base side and having two side legs; and
  a second solid profile section in the form of a non-right trapezoid having a short and a longer base side and having two side legs;
wherein the longer base side of the first solid profile section and the shorter base side of the second solid profile section coincide with one another;
wherein one of the two side legs of the first solid profile section and one of the two side legs of the second solid profile section lie on a straight line which encloses a first angle in the range between 40° and 50° with the longer base side of the second solid profile section; and
wherein the other side leg of the second solid profile section is angled outward in relation to the other side leg of the first solid profile section by a second angle in the range between 25° and 35°,
wherein the luminous band has a coupling surface for coupling in the light emitted by the luminous band and a decoupling surface for decoupling the coupled-in light;
wherein the coupling and decoupling surfaces extend in parallel to one another and the profile width of the linear lens is greater at the decoupling surface than at the coupling surface,
wherein the light exits on one profile side of the solid profile at a lateral exit angle of up to approximately 35° and on the other profile side of the solid profile at a lateral exit angle of up to approximately 80° to 85° from the decoupling surface.

18. The linear luminaire as claimed in claim 17, wherein the linear lens closes the open side of the U-shaped profile.

19. The linear luminaire as claimed in claim 17, wherein the second solid profile section has lateral attachments in the two corner regions of the longer base side and the two side legs.

20. The linear luminaire as claimed in claim 17, wherein a profile detent web protrudes from each of the two side legs of the second solid profile section in the direction perpendicular to the longer base side of the second solid profile section away from this base side.

* * * * *